US009760902B2

(12) United States Patent
Van de Sompel et al.

(10) Patent No.: US 9,760,902 B2
(45) Date of Patent: Sep. 12, 2017

(54) PING COMPENSATION FACTOR FOR LOCATION UPDATES

(71) Applicant: Facebook, Inc., Menlo Park, CA (US)

(72) Inventors: Dominique Marcel Georgette Van de Sompel, San Francisco, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/209,466

(22) Filed: Jul. 13, 2016

(65) Prior Publication Data

US 2016/0321686 A1 Nov. 3, 2016

Related U.S. Application Data

(63) Continuation of application No. 14/507,296, filed on Oct. 6, 2014, now Pat. No. 9,420,442.

(51) Int. Cl.
| | |
|---|---|
| *H04W 24/00* | (2009.01) |
| *G06Q 30/02* | (2012.01) |
| *H04W 4/20* | (2009.01) |
| *H04W 4/02* | (2009.01) |
| *G06Q 50/00* | (2012.01) |

(52) U.S. Cl.
CPC .......... *G06Q 30/0205* (2013.01); *H04W 4/02* (2013.01); *H04W 4/023* (2013.01); *H04W 4/206* (2013.01); *G06Q 30/0254* (2013.01); *G06Q 50/01* (2013.01)

(58) Field of Classification Search
CPC .......... G06Q 30/0205; G06Q 30/0254; G06Q 50/01; H04W 4/02; H04W 4/023; H04W 4/206
USPC ...................................................... 455/456.1
See application file for complete search history.

(56) References Cited

U.S. PATENT DOCUMENTS

| | | | |
|---|---|---|---|
| 9,088,865 B2 * | 7/2015 | Vaccari | H04W 4/02 |
| 2012/0047147 A1 * | 2/2012 | Redstone | G06F 17/3087 |
| | | | 707/748 |

* cited by examiner

*Primary Examiner* — Nader Bolourchi
(74) *Attorney, Agent, or Firm* — Baker Botts L.L.P.

(57) ABSTRACT

In one embodiment, a computing system receives a number of location updates sent by one or more users. These location updates may have different geographic locations, but refer to the same place or point of interest. Each location update corresponds to a user visit to the place or point of interest, and each location update is determined by a mobile client device of the corresponding user. The mobile client device may determine a location update by any one or more of a number of location methods available to the mobile client device. The computing system determines a ping compensation factor to be associated with the place or point of interest. The ping compensation factor is based on a total number of visits to the particular place, versus the subset of visits to the particular place determined by a first location method from the number of location methods.

54 Claims, 6 Drawing Sheets

PING COMPENSATION FACTOR FOR LOCATION UPDATES

PRIORITY

This application is a continuation under 35 U.S.C. §120 of U.S. patent application Ser. No. 14/507,296, filed 6 Oct. 2014.

TECHNICAL FIELD

This disclosure generally relates to detecting user locations to determine a number of users who visit a particular location.

INCORPORATION BY REFERENCE

The following are hereby incorporated by reference as examples and not by way of limitation: U.S. patent application Ser. No. 13/327,557, filed 15 Dec. 2011; U.S. Patent Application Publication No. 2012/0203831, filed 3 Feb. 2012; U.S. Patent Application Publication No. 2012/0233009, filed 9 Mar. 2011; U.S. patent application Ser. No. 13/212,356, filed 18 Aug. 2011; U.S. Patent Application Publication No. US 2012/0084160, filed 5 Oct. 2010; U.S. Patent Application Publication No. US 2012/0232998, filed 8 Mar. 2011; U.S. Patent Application Publication No. US 2009/0119167 filed 18 Aug. 2008; U.S. Patent Application Publication No. US 2009/0070219, filed 20 Aug. 2008; U.S. Patent Application Publication No. US 2012/0158501, filed 15 Dec. 2010; U.S. Patent Application Publication No. US 2012/0166532, filed 23 Dec. 2010; U.S. Patent Application Publication No. US 2012/0159635, filed 15 Dec. 2010; U.S. Patent Application Publication No. US 2012/0158753, filed 15 Dec. 2010; U.S. Pat. No. 7,669,123, filed 11 Aug. 2006; U.S. Patent Application Publication No. US 2008/0040475, filed 11 Aug. 2006; U.S. Patent Application Publication No. US 2012/0072428, filed 16 Sep. 2010; U.S. Patent Application Publication No. US 2011/0004692, filed 1 Jul. 2009; U.S. Patent Application Publication No. US 2008/0065701, filed 12 Sep. 2006; U.S. Patent Application Publication No. US 2008/0065604, filed 17 Jan. 2007; U.S. Pat. No. 8,244,848, filed 19 Apr. 2010; U.S. Patent Application Publication No. US 2011/0083101, filed 6 Oct. 2009; U.S. Pat. No. 8,150,844, filed 18 Aug. 2010; U.S. patent application Ser. No. 13/051,286, filed 18 Mar. 2011; U.S. patent application Ser. No. 13/096,184, filed 28 Apr. 2011; U.S. patent application Ser. No. 13/276,248, filed 18 Oct. 2011; or U.S. Patent Application Publication No. US 2012/0197709, filed 1 Feb. 2011; U.S. patent application Ser. No. 13/042,357, filed 7 Mar. 2011; U.S. Patent Application Publication No. 2013/0331119, filed 6 Feb. 2013, U.S. patent application Ser. No. 13/323,915, filed 3 Jul. 2014; U.S. patent application Ser. No. 14/323,923, filed 3 Jul. 2014; U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may present advertisements to its users regarding a place of business. The advertisements may provide incentives for users to visit the physical place of business. The social-networking system may use location services for its users to determine whether the users who view the advertisements subsequently visit the advertised place of business. To account for users who do not have location services enabled while at the place of business, the social-networking system may estimate a total number of users within a particular demographic category or during a particular time period.

In particular embodiments, users may send location updates to the social-networking system through a foreground location update, a background location update, or both. A foreground location update may be sent if a user accesses a social-networking application on their mobile device (i.e. bringing the social-networking application to the foreground of their display). A background location update may be sent automatically by a user's mobile device to the social-networking system at periodic intervals, or when the mobile device determines one or more conditions for sending a location update are meant. A background location update does not require any user action other than the user carrying the mobile device as they move. In particular embodiments, the social-networking system may determine a number of users who have visited a particular place. Determination that a visit to a place has occurred may require that a user spend a threshold amount of time at a location corresponding to the place, be checked-in at the place, or go to a particular section within the place. The social-networking system may determine for a particular time period the number of visiting users, wherein the visiting user locations were sent by a foreground location update, a background location update, or both.

In particular embodiments, the social-networking system may estimate the number of visiting users who did not send any location updates from the place based on the ratio of foreground-only location updates to the total number of location updates sent by either foreground or background location methods. The social-networking system may apply that same ratio to those visiting users who sent foreground location updates and do not have background location updates enabled to determine the number of users who did not send foreground or background location updates. The ratio may be determined to be a ping compensation factor based on the particular time period measured or demographic group measured. The ping compensation factor may be further adjusted based on any changes made to the demographic group considered. Using the ping compensation factor, the social-networking system may be able to provide an accurate estimate of the total number of users visiting a place of business based on the number of users who send a foreground location update from the place of business.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
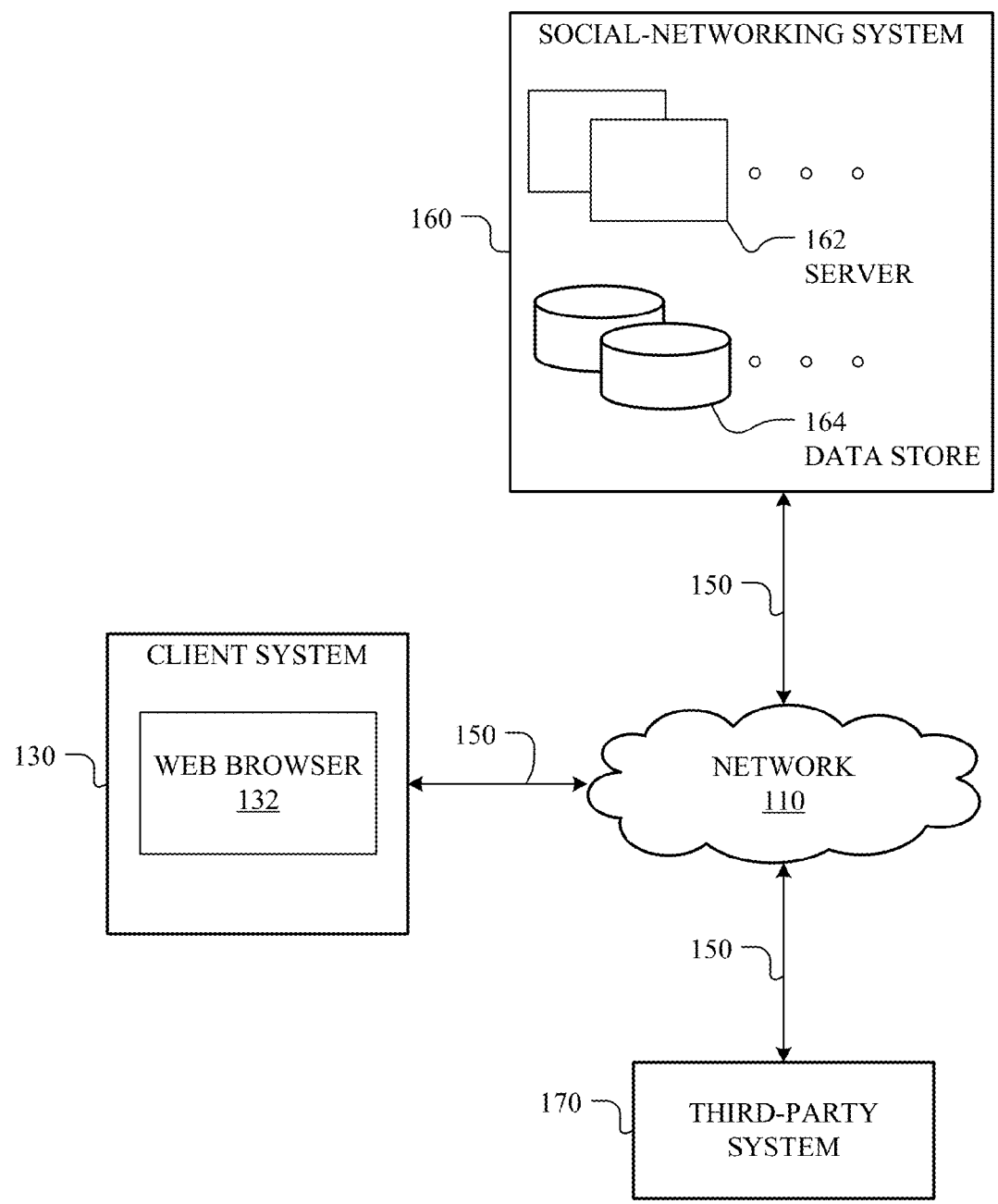
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
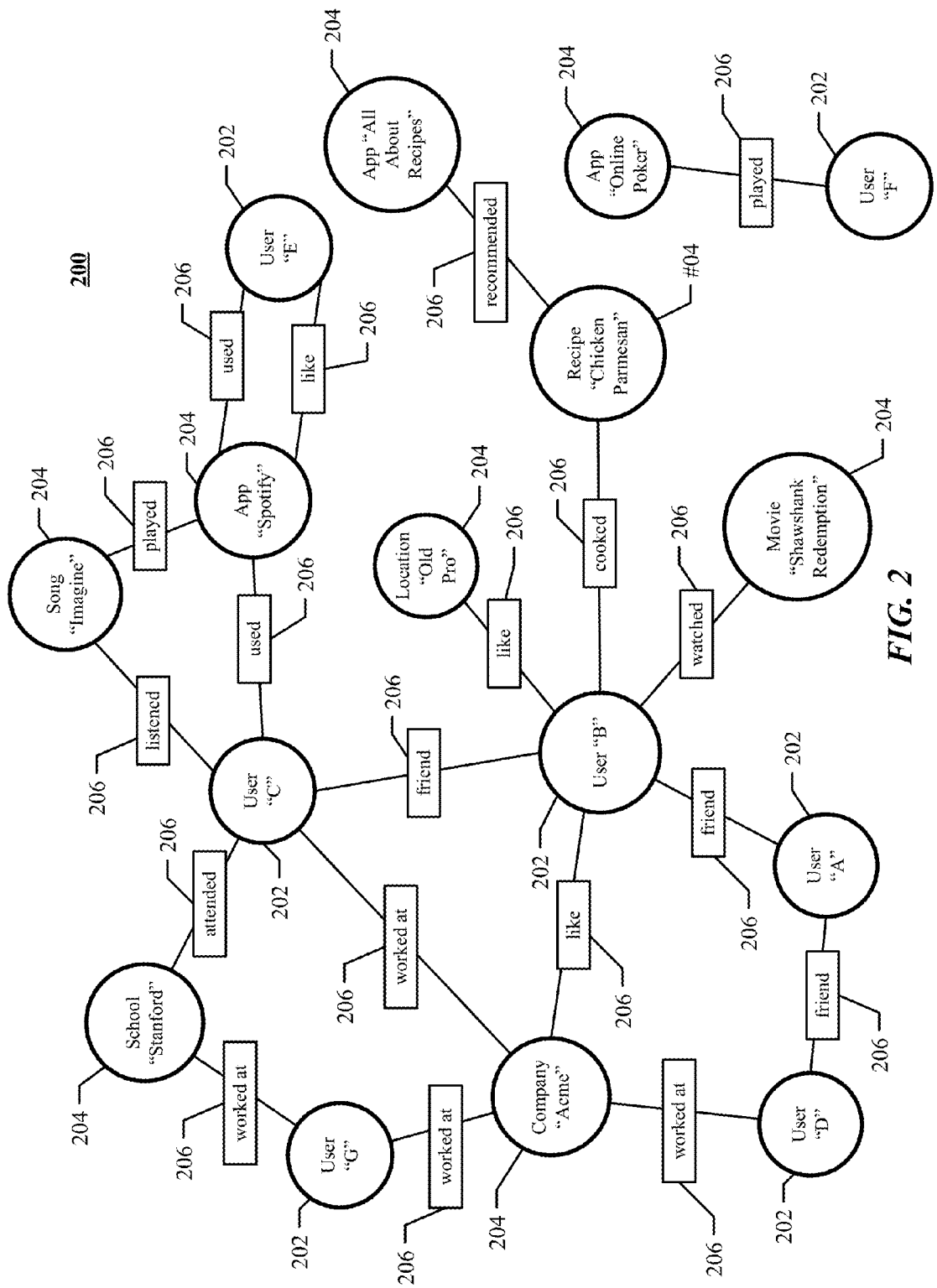
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. US 2011/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, the social-networking system 160 may determine a geographic location (hereinafter also simply "location") of an object (e.g., a user, a concept, or a mobile-client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a mobile-client system 130 equipped with cellular, Wi-Fi, GPS, or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations. The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, filed 19 Apr. 2010, which is incorporated by reference herein). The social-networking system 160 may allow users to access information regarding a location using a client application (e.g., a web browser or other suitable application) hosted by a mobile-client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a mobile-client system 130, access the geo-social-networking system to register the user's presence at the location. The social-networking system 160 may automatically check-in a user to a location based on the user's current location and past location data (such as, for example, as described in U.S. patent application Ser. No. 13/042,357, filed 7 Mar. 2011 which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

In particular embodiments, social-networking system 160 may be able to automatically and without any manual input from the user, track the location of mobile client system 130. Social-networking system 160 may poll or "ping" the mobile client system 130 at pre-determined intervals to obtain location information through an application of mobile client system 130 running in a background mode. In response to the ping, the application of mobile client system 130 may activate a location service of mobile client system 130. In particular embodiments, a process on mobile client system 130 may periodically send location updates to social-networking system 160. This may be described as a "background location method" or "background location update," in which the location services and updates to social-networking system 160 are performed in the background of a mobile client system 130. In particular embodiments, location updates may be provided by a mobile client system 130 through any suitable means such as cell tower triangulation, Wi-Fi based location services, or tracking Bluetooth MAC addresses. In particular embodiments, a place may determine the location of one or more users within the place based on any suitable method, and provide the location information to social-networking system 160. Social-networking system 160 may adjust the polling frequency or sampling duration based on various factors. In particular embodiments, a user of social-networking system 160 may opt to send background location updates to social-networking system 160. In particular embodiments, social-networking system 160 may record whether a particular user has enabled background location updates on his or her mobile client system 130. Background location updates are further described in U.S. Patent Application Publication No. 2013/0331119, filed 6 Feb. 2013, and U.S. patent application Ser. No. 13/323,915, filed 3 Jul. 2014, which are incorporated by reference herein.

In particular embodiments, social-networking system 160 may determine the location of a user by other information provided to social-networking system 160. As an example and not by way of limitation, social-networking system 160 may receive data indicating a user transaction at a store, such as a record of a purchase at the store. Social-networking system 160 may determine that at the time of the purchase, the particular user was at the location of the store. As another example and not by way of limitation, social-networking system 160 may receive information indicating a check-in relating to a user. The check-in may be provided by the user referenced in the check-in, or by another user who is connected to the referenced user on social-graph 200.

In particular embodiments, a user may actively provide his or her location to social-networking system 160 through an application running in the foreground of a mobile client system 130 associated with the user. As an example and not by way of limitation, when a user accesses an application for social-networking system 160 on a mobile client system 130, mobile client system 130 may be configured to send its current location to social-networking system 160. Mobile client system 130 may determine its location at the time that the application of social-networking system 160 is opened. In particular embodiments, mobile client system 130 may store location updates in a data store of mobile client system 130. When an application of social-networking system 160 is opened, mobile client system 130 may determine if there is a recent location update for mobile client system 130. If there is a recent location update, mobile client system 130 may send the recent location update to social-networking system 160. If there is no recent location update, mobile client system 130 may determine its current location and send the current location to social-networking system 160. In particular embodiments, social-networking system 160 may record that the user provided a location update through a foreground location update.

In particular embodiments, social-networking system 160 may be able to determine a total number of location updates sent from a particular location for a particular group of users, wherein the total number is the sum of foreground location updates and background location updates. In particular embodiments, the particular group of users may be users who have background location updates enabled on their mobile client systems 130. As an example and not by way of limitation, social-networking system 160 may record for a given week at a particular geographic location 10 foreground location updates from the group of users with background location methods enabled, and an additional 90 background location updates from the same group of users. Social-networking system 160 would then record 100 total location updates by the background-enabled group of users for that week within the geographic location.

In particular embodiments, a single user may send location updates using both foreground location updates and background location updates at substantially the same time at substantially the same location. As an example and not by way of limitation, a user may enter a store, and mobile client system 130 of the user may send a background location update to social-networking system 160 while the user is at the store. While the user is at the store, the user may also open an application of the social network on mobile client system 130, which may then send its current location to social-networking system 160. Social-networking system 160 may determine that both methods were used by this user for a location update at the store.

In particular embodiments, social-networking system 160 may use background location data to determine that a particular user has visited a particular place. As an example and not by way of limitation, if the geographic location of a background location update for a user corresponds to a geographic location associated with a place on a map database of social-networking system 160, social-networking system 160 may determine that the user is at the place. In particular embodiments, social-networking system 160 may set a threshold time period for a particular place in determining that a user has visited the place. Social-networking system 160 may determine for a location update the length of an associated time stamp with that location; in particular embodiments, social-networking system 160 may determine the location of the user immediately before and after the user is detected at the place. As an example and not by way of limitation, a user may be detected at Place A at time B. Social-networking system 160 that five minutes prior to B, the user was five miles away from A; and that five minutes after B, the user was three miles away from A. Social-networking system 160 may determine in this example that it is very unlikely that the user actually visited A, and that the location update at place A was merely a temporary location update, e.g. a drive-by location update. As another example and not by way of limitation, a user's background location update may be associated with a time stamp of 20 minutes, indicating that the user was at that location for at least 20 minutes. If social-networking system 160 determines that 20 minutes is sufficient for a user to have visited a place associated with the geographic location, social-networking system 160 may determine that the user has visited the place. In particular embodiments, the type of place may determine the time threshold for determining that the user has visited the place. As an example and not by way of limitation, for a place that is a convenience store, social-networking system 160 may determine that a user only has to be at the store for 3 minutes before determining that the user is actually visiting the place, and not merely passing by. As another example and not by way of limitation, social-networking system 160 may determine that for a dentist's office, the time threshold should be about 30 minutes to determine that the user is actually visiting the dentist's office. Social-networking system 160 may determine a time threshold for individual places, or for classes or groups of places, wherein each of the places in the class or group is likely to have the same minimum time required for a user to be considered a "visitor".

In particular embodiments, social-networking system 160 may require that a user visit a particular sub-location of a place before considering a user to have visited the place. As an example and not by way of limitation, a large store may have its cash registers located in one corner of the store area. The store may be interested in determining a number of users who have visited the store, and made a purchase or some other transaction. Social-networking system 160 may determine that if a user is detected with a location update at the corner of the store where the cash registers are located, then the user is more likely to be making a transaction, and consider that user to have visited the store. If another user has entered the store but leaves without ever nearing the corner with the cash registers, social-networking system 160 may consider that user to not be a visitor of the store.

Figure 3:
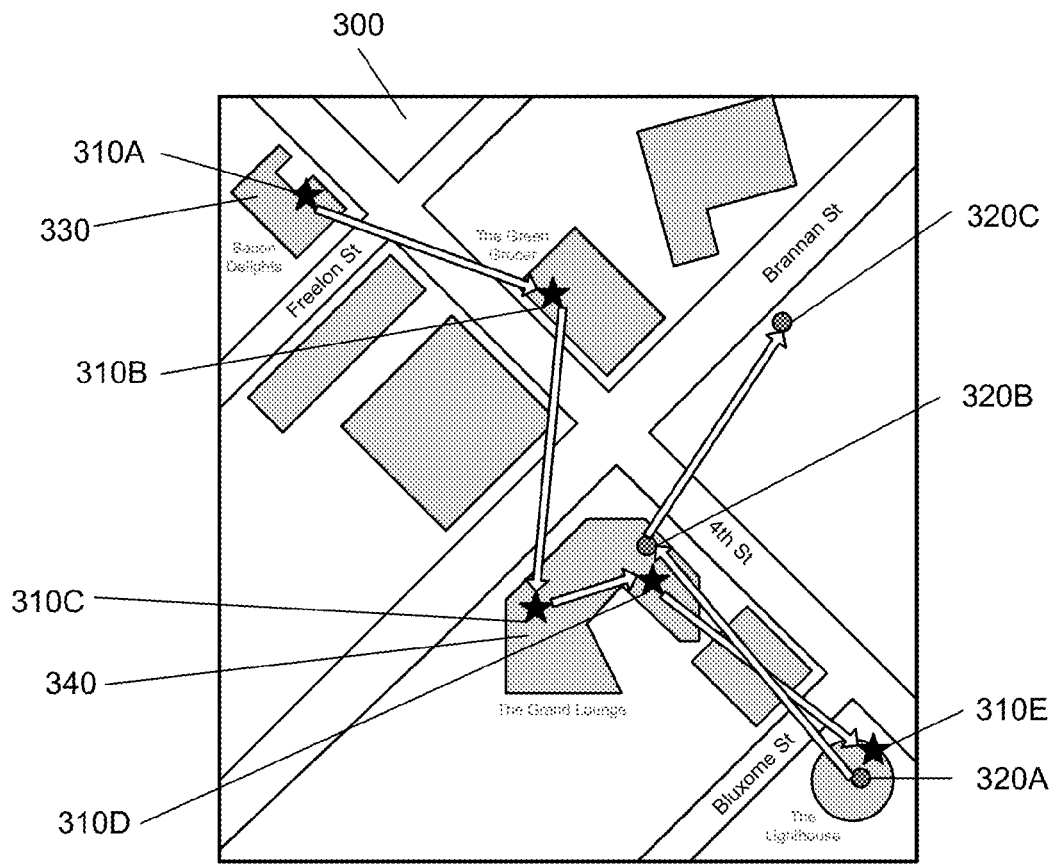
FIG. 3 illustrates an example background location history for a user.

FIG. 3 illustrates an example view of location updates of users of social-networking system 160. In a map view 300, the location updates sent by users 310 and 320 may be determined over a period of time. In the example of FIG. 3, user 310 has sent five location updates 310A-E. User 320 has sent three location updates 320A-C. Social-networking system 160 may be able to determine an order of the location updates based on the respective time associated with each location update. The location updates may be sent through foreground location updates, through background location updates or both. Social-networking system 160 may determine one or more places that may be associated with a location update. In the example of FIG. 3, social-networking system 160 may determine that user location update 310A may be associated with place 330, and that user location updates 310C, 310D, and 320B may all be associated with place 340. In particular embodiments, social-networking system 160 may use a time requirement to determine whether a user has actually visited the place. For example, a time stamp associated with location update 320B may indicate that user 320 was only at location 320B for two minutes. Alternatively, social-networking system 160 may determine that the gap in time between location updates 320A and 320C is only five minutes, so user 320 could not have spent any more than five minutes at location 320B. If the time associated with location update 320B is below the threshold time determined by social-networking system 160 for place 340, then social-networking system 160 will not record the location update as a visit. If location update 320B has an associated time exceeding the threshold time for place 340, then social-networking system 160 will record user 320 as having visited place 340 at the time that location update 320B was sent.

In particular embodiments, social-networking system 160 may only consider location updates from a particular subsection of a place to be a visit to the place. In the example of FIG. 3, user 310 is at place 340 for location updates 310C and 310D. However, social-networking system 160 may consider only locations in the eastern section of place 340 to be a visit to the place. As an example and not by way of limitation, the cash registers for place 340 may be located on the eastern side, and social-networking system 160 may only wish to count users who purchase or otherwise engage in a transaction with place 340 to be considered a visitor. Users who have location updates on the opposite side of the store may not be counted as a visitor. In the example of FIG. 3, location update 310C may not be considered a visit to place 340 regardless of any time requirement, while location update 310D may be considered a visit if the user was at location 310D for a sufficient period of time.

In particular embodiments, a mobile client system 130 of a user may send location updates to social-networking system 160 immediately after determining the location update. In the example of FIG. 3, the mobile client system 130 of user 320 making the location updates may send location update 320A immediately after determining that the mobile client system 130 is at the location of 320A, and subsequently determine that it is at location 320B and immediately send location update 320B to social-networking system 160. In particular embodiments, a mobile client system 130 may be configured to cache a plurality of location updates and provide the plurality of location updates in a single update sent to social-networking system 160. In the example of FIG. 3, for user 310, the user's mobile client system 130 may determine that its location is at the locations corresponding to 310A, 310B, and 310C. However, the mobile client system 130 may be configured to only send location updates at particular time intervals. In this case, the mobile client system 130 may wait to send location updates 310A-C until the time interval has passed, then send all three location updates at the same time to social-networking system 160. Since each location update will be associated with a time stamp, social-networking system 160 will be able to place them in the correct order and for the correct duration of time. Methods for sending multiple location updates at the same time to a social-networking system and varying the polling period for periodic location updates is further discussed in U.S. patent application Ser. No. 14/323,923, filed 3 Jul. 2014, which is incorporated by reference herein.

In particular embodiments, a location update sent by a user may be a check-in or a transactional event being recorded by social-networking system 160. As an example and not by way of limitation, location update 310A may be a check-in by user 310 at place 330. As another example, location update 310A may be a record of a purchase made by user 310 at place 330.

In particular embodiments, social-networking system 160 may provide information to businesses regarding the success of advertising on social-networking system 160 regarding those businesses. In particular embodiments, social-networking system 160 may provide a conversion rate to a business, which may represent the rate of users who visit a store after receiving an advertisement related to that business. In particular embodiments, social-networking system 160 may be able to provide a conversion rate for a particular group of users, wherein the group of users share a common demographic trait. As an example and not by way of limitation, a women's clothing store may be interested in knowing how many users of social-networking system 160 who are female and aged 17-34 visit the clothing store after being presented with an advertisement for the clothing store on social-networking system 160. In particular embodiments, social-networking system 160 may be able to provide a conversion rate based on determining users who have visited the place, a visit being determined by an indication that the user location is at the place. As an example and not by way of limitation, a user may visit a store and access an application of social-networking system 160 on a mobile client system 130. Responsive to the access of the application, mobile client system 130 may send its present location to social-networking system 160. Social-networking system 160 may determine that the user is at the store, and determine whether the user is visiting the store based on the time that the user has spent at the store, or whether the user has visited a particular location within the store. If social-networking system 160 determines that the user has visited the store, social-networking system 160 may determine whether that user has received one or more advertisements related to the store. If the user has received such an advertisement, social-networking system 160 may adjust a conversion rate for the store based on the user's visit. In particular embodiments, a user may send a background location update at a store to social-networking system 160. Social-networking system 160 may use the background location update to determine that the user has visited the store.

In particular embodiments, social-networking system 160 may determine a number of location updates sent by one or more users of social-networking system 160, wherein social-networking system 160 has complete information about the users, and compute a ratio of location updates for the one or more users. In particular embodiments, social-networking system 160 may then extrapolate information about a group of users for whom social-networking system 160 has incomplete information, based on the computed ratio. In particular embodiments, complete-information users may comprise those users who send location updates to social-networking system 160 through all available methods for sending a location update. As an example and not by way of limitation, a complete-information user may be considered a user that has background location services enabled, and foreground location services enabled on a mobile client system 130 associated with the user. In this example, an incomplete-information user may be considered a user that does not send location updates through all available means, such as a user who only sends foreground location updates. In particular embodiments, social-networking system 160 may extrapolate information only to incomplete-information users with similar characteristics to one or more complete-information users, or incomplete-information users in the same demographic group as the one or more complete-information users.

As an example and not by way of limitation, social-networking system 160 may receive location updates from a particular user Mary with both foreground and background location methods enabled. Social-networking system 160 may determine that Mary has visited a total of 40 distinct places during a given week. Of those 40 places, 5 of those place-visits may have been detected solely through foreground location updates, without any background location updates from those five places. Using this information, social-networking system 160 may determine that Mary and other users like Mary visits 40/5=8 times as many places as foreground-only location updates would indicate. In other words, social-networking system 160 may determine that using foreground-only location updates to determine places that Mary visits would be an underrepresentation of the actual number of places visited. Social-networking system 160 may then apply this information to other users who have provided incomplete information to social-networking system 160. In this example, social-networking system 160 may determine that there is another user, Siegfried, who is demographically similar to Marv, but who only sends foreground location updates. From the foreground location updates, social-networking system 160 may determine that Siegfried has visited 7 distinct places during the week. Social-networking system 160 may determine that based on Marv's location updates, a user like Siegfried is likely to visit 8 times as many locations as foreground location updates alone would indicate. Therefore, social-networking system 160 may estimate that Siegfried was actually at 7*8=56 distinct places during that week.

In the example discussed above, social-networking system 160 may determine a ping compensation factor which may be used to adjust the number of places visited by users within a particular demographic group, based on the location updates sent by a subset of users within the demographic group, i.e. the complete-information users. In particular embodiments, this ping compensation factor may be used to estimate the number of users within the demographic group at any location. Continuing the example above, if in that same week, social-networking system 160 determine that 5 foreground-only users in the same demographic group as Mary and Siegfried (M&S group) sent foreground location updates from a particular store, then there must have also been a total of 8 times as many users from the M&S group, for a total of 40 M&S group users at that particular store during the week. If the store next door recorded 25 visits from M&S group users who are foreground-only, that store would also use the ping compensation factor to estimate that 25*8=200 M&S foreground-only users actually visited that store. In particular embodiments, social-networking system 160 may calculate different ping compensation factors for different places, or types of places. As an example and not by way of limitation, social-networking system 160 may determine that complete-information users send foreground location updates more frequently at restaurants, and fewer foreground location updates at doctor's offices. Therefore, social-networking system 160 may use different ping compensation factors at each type of place to accurately estimate the total number of users at each place.

As another example and not by way of limitation, some users may have both foreground and background location updates, while others may have only foreground location updates. In particular embodiments, background location updates may be more frequent, such that a number of unique users counted by means of background location updates plus foreground location updates within a given measurement area may be close to the true number of background location update-enabled users what visited that area. This may not be true of foreground-only users. Therefore, social-networking system 160 may estimate the number of background location updates plus foreground location updates that the foreground-only users would have sent had they had background location updates enabled. Therefore, a ratio may be computed from the demographically similar group of background-enabled and foreground-enabled users, and the ratio applied to the corresponding foreground-only users.

In particular embodiments, users of social-networking system 160 may visit a place, but not have any location updates. Social-networking system 160 may estimate the total number of users of social-networking system 160 visiting the place based on the users who have been detected by social-networking system 160 at the place. As an example and not by way of limitation, if social-networking system 160 is able to determine that 10% of all users who visit store A will send a location update from store A to social-networking system 160 (e.g. through a foreground location update or a background location update), and social-networking system 160 detects ten users at store A during a period of time, social-networking system 160 may extrapolate the received information and estimate that a total of 100 users actually visited store A. In particular embodiments, social-networking system 160 may extrapolate a total number of visiting users within a specific demographic category.

As an example and not by way of limitation, in particular embodiments, social-networking system 160 may identify three groups of users sending location updates: a first group of users with both foreground location services and background location services enabled (B+F); a second group of users with foreground location services disabled, and background location services enabled (B); and a third group of users with foreground location services enabled but background location services disabled (F). In particular embodiments, the number of users in the (B) group may be extremely small. In particular embodiments, social-networking system 160 may determine a plurality of location updates for a particular place, with each location update being associated with a user of social-networking system 160. Social-networking system 160 may determine the total number of distinct users (L) with location updates at the place. For each location update, social-networking system 160 may determine whether the associated user is in the (B+F) group, the (B) group, or the (F) group. In this example, the sum of the number of users in the (B+F) group, the (B) group, and the (F) group may add up to the total number of users (L).

In particular embodiments, social-networking system 160 may further filter the users in the (B+F) group by a demographic criteria, for example by age or gender. As an example and not by way of limitation, a (B+F) group may comprise 50 users ranging in age from 15 to 45. If social-networking system 160 applies a filter for only male users from ages 18-34, the filtered (B+F) group may comprise 15 users who are male and aged 18-34. As another example, social-networking system 160 may filter a group of users by the frequency with which each user accesses social-networking system 160. In this example, social-networking system 160 may filter a (B+F) group by users who have accessed social-networking system 160 (via their mobile client system 130, or another computing device) at least once in the last 24 hours. This filtered group of users may comprise users who frequently access social-networking system 160, and may have a higher frequency of foreground location updates compared to users who have not accessed social-networking system 160 as recently. From the narrowed (B+F) group of users, social-networking system 160 may calculate a ping compensation factor for this group of users based on the number of foreground location updates sent by this group. As an example and not by way of limitation, if a filtered set of (B+F) group users for a coffee shop consists of 12 users, and of that group, two sent foreground location updates, social-networking system 160 may calculate a ping compensation factor of six (12/2).

In particular embodiments, the ping compensation factor may be applied to the (F) group of users. In particular embodiments, social-networking system 160 may apply the ping compensation factor for a particular demographic subset of (B+F) users to the same demographic subset of (F) users. Continuing the example above, if the coffee shop had five location updates from the filtered set of (F) group users (the filter being the same as the filter for the (B+F) group), then social-networking system 160 may apply the ping compensation factor of 6 and determine that there are actually a total of 30 users from the filtered (F) group. In other words, social-networking system 160 may estimate that there were 30 filtered (F) group users at the coffee shop, but only six sent foreground location updates. Social-networking system 160 may estimate that had these (F) group users enabled background location updates, social-networking system 160 would have received 24 background location updates for a total of 30 location updates from the (F) group.

In particular embodiments, different filtered groups of users may have different ping compensation factors. As an example and not by way of limitation, for a particular store, social-networking system 160 may determine that a (B+F) group of users filtered for users female and aged 21-34 have a ping compensation factor of 10, while the same original (B+F) group of users filtered for users male and aged 35-55 have a ping compensation factor of 30. In this example, social-networking system 160 would apply a ping compensation factor of 10 to the (F) group of users female and aged 21-34, while applying a ping compensation factor of 30 to the (F) group of users male and aged 35-55.

In particular embodiments, social-networking system 160 may determine a ping compensation factor for a place or a class or type of places. The ping compensation factor may be used to extrapolate the number of users detected at a particular place to the total number of users estimated to have visited the place. In particular embodiments, social-networking system 160 may use a subset of users who have a higher frequency of location updates sent to social-networking system 160. In particular embodiments, the subset of users may be users who have background location updates enabled. As an example and not by way of limitation, if there are 5 background-enabled users who were detected at the place through foreground location updates, and 20 background-enabled users were detected using only background location updates, social-networking system 160 may determine that for every user of social-networking system 160 who use foreground location updates from the place, there will be five total users who are at the place. This ratio may be extrapolated to the population of users who do not have background location updates enabled. In this example, if social-networking system 160 detects 10 foreground-only users who sent foreground location updates from the place, applying the same ratio, social-networking system 160 may estimate that there were actually a total of 50 users. This may be helpful in situations where most users may not actively update their location to social-networking system 160. In particular embodiments, this estimation may allow social-networking system 160 to determine a number of foreground-only users who are otherwise underrepresented by their location updates. As an example and not by way of limitation, a user may not access a social-networking application when the user is at a bail bondsman. Therefore, an accurate determination of how many users visit the bail bondsman will require a factor for extrapolation to a total number. If only one in every 1000 users who visit a bail bondsman actually send a foreground location update from the bail bondsman, social-networking system 160 may estimate that there are 1000 times as many users who actually visit the bail bondsman, compared to the recorded number of foreground visits. As another example and not by way of limitation, 25% of background-enabled users who visit a dentist's office may provide their location to social-networking system 160. In this example, social-networking system 160 may adjust the number of users detected at the dentist's office by a factor of four to estimate the total number of visiting users.

In particular embodiments, a ping compensation factor may be expressed as the ratio within a group of users of total location updates to foreground-only location updates. As an example and not by way of limitation, if background-enabled users have sent a total of 100 location updates using either method (foreground or background) to social-networking system 160, and social-networking system 160 further determines 20 location updates were via a foreground location update, social-networking system 160 may determine a ping compensation factor of five. In particular embodiments, the ping compensation factor may be expressed as the ratio of foreground location updates to non-foreground location updates. As an example and not by way of limitation, in the example above, social-networking system 160 may further determine that 80 location updates were not foreground location updates (i.e. they were background location updates). Social-networking system 160 may then determine a ping compensation factor of four (80/20) which represents the ratio between users who will send foreground location updates and those who will not. Applying this type of ping compensation factor, if social-networking system 160 then records 10 location updates from foreground-only users (meaning these location updates could only be foreground location updates), then social-networking system 160 will determine that there are 40 other foreground-only users who are at the same place, for a total of 50. A total number of estimated visitors will remain the same regardless of how the ping compensation factor is calculated.

Figure 4:
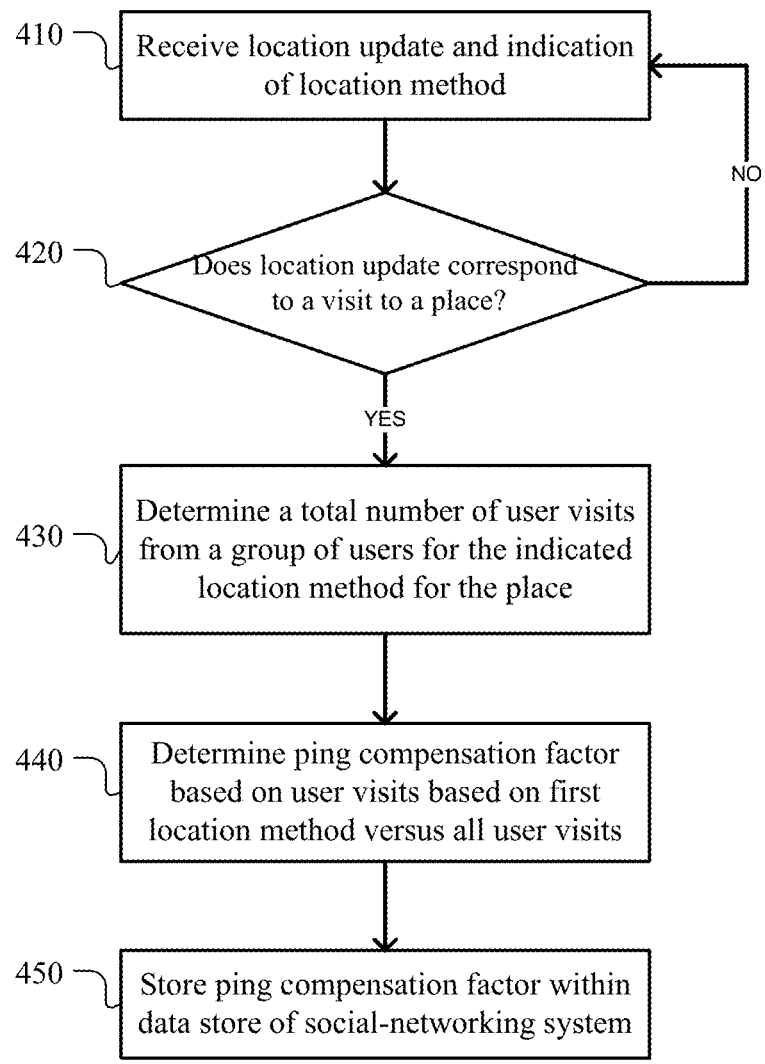
FIG. 4 illustrates an example method for determining a ping compensation factor for estimating a total number of users at a particular location.

FIG. 4 illustrates an example method for determining a ping compensation factor for estimating a total number of users at a given location for a particular time period, given a subset of users who have provided location information to social-networking system 160. At step 410, social-networking system 160 may receive a location update which corresponds to a particular user of social-networking system 160. The location update and associated user information may comprise one or more demographic categories for which the user belongs, and an indication of the method by which a location update was sent. As an example and not by way of limitation, the location update may indicate that it is a background location update by a 27-year old male user living in Berkeley, Calif. The method for sending a location update may be a foreground location update provided by a user accessing a social-networking application on a mobile client system 130, or a background location update provided by the user's mobile client system 130 to social-networking system 160, or both. At step 420, social-networking system 160 may determine whether the user's location corresponds to a visit to a place. As discussed above, determination of whether a user is visiting a place may comprise determining that the geographic location of the location data matches the geographic location of a place, or a check-in at the place. The requirements for a visit may further comprise a time requirement for the user to remain at the place, or a sub-location requirement that the user go to a certain part of the place. At step 430, social-networking system 160 may determine a number of user visits to the place within a particular period of time, grouped by one or more demographic groups, and the method used to receive the location data. As an example and not by way of limitation, social-networking system 160 may determine a total number of user visits detected by social-networking system 160 for users living in Berkeley, Calif. during a particular week, grouped by whether the location data was provided by foreground location updates, background location updates, or both, and grouped by the location update methods enabled for each user. As an example and not by way of limitation, a foreground location update may be received from a user who only sends foreground location updates. At step 440, social-networking system 160 may determine a ping compensation factor for the place, based on the number of total location updates versus updates sent by a first location method. In particular embodiments, the groups of users detected using any location method may be further filtered by a demographic category, so that social-networking system 160 only considers user visits by users within the demographic category. At step 450, social-networking system 160 may store the ping compensation factor within a data store of social-networking system 160, wherein the ping compensation factor is associated with the particular place for which the ping compensation factor was determined, the one or more demographic categories considered for the ping compensation factor, and the period of time during which the visits were recorded.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

As an example and not by way of limitation, social-networking system 160 may record the number of users who are recorded visiting a particular Abercrombie & Fitch® store. Social-networking system 160 may record visits from users during weekends in July, who are women aged 13-29. Social-networking system 160 may determine a number of location updates sent from the Abercrombie & Fitch® during the weekends in July, including check-ins of female users aged 13-29 at the store. In this example, social-networking system 160 may collect location updates during specified days of July from mobile client systems 130 associated with users within this demographic group, wherein the location updates correspond to visits to the Abercrombie & Fitch® store. Social-networking system 160 may determine whether each location update was a background location update or a foreground location update. For each type of location update, social-networking system 160 may further determine whether the user associated with the location update had both background and foreground location updates enabled on their mobile client system 130.

Figure 5B:
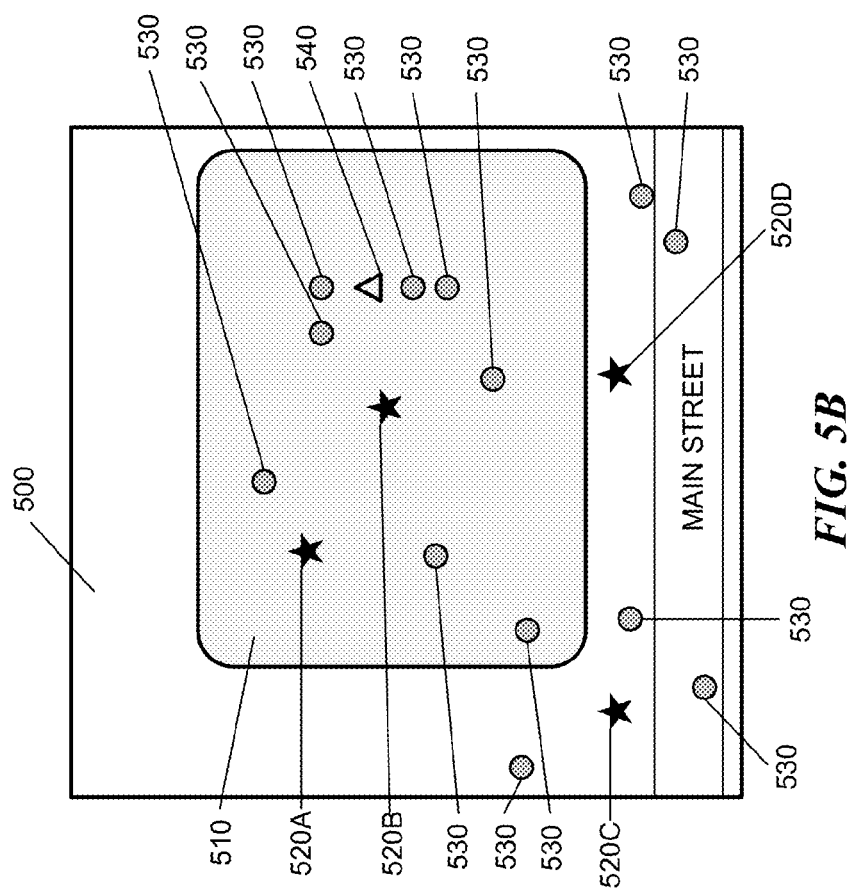
FIGS. 5A and 5B illustrate an example view of background and foreground location updates.
Figure 5A:
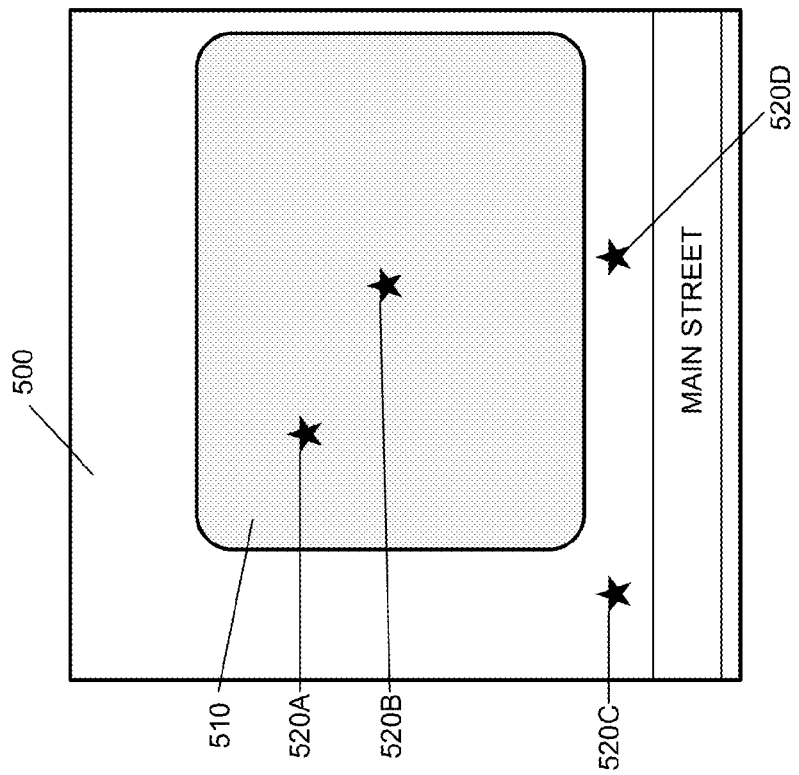

FIGS. 5A and 5B illustrate an example of detecting users at a particular place based on the type of location update provided to social-networking system 160 in order to determine a ping compensation factor. In FIG. 5A, a map view 500 is shown depicting a place 510. User location updates 520A-D are shown, wherein each location update 520A-D was obtained through a foreground location update. As an example, a user sending location update 520A may be accessing a social-networking application on their mobile client system 130 from the location of 520A. As another example, location update 520B may be determined by a user checking-in at place 510. In this example, social-networking system 160 may specify any particular predetermined location for when the user has checked-in to a place. In the example of FIG. 5A, the predetermined location may be near the center of place 510. Social-networking system 160 may determine that one or more users are considered to have visited the place based on a time requirement or a sub-location requirement for the particular place.

In particular embodiments, location updates 520A-D may be sent by users who have background location updates enabled (e.g. from the (B+F) group of users). In FIG. 5B social-networking system 160 may determine a total number of location updates sent to social-networking system 160 by background-enabled users, including a number of background location updates 530. These background location updates 530 may comprise periodic location updates sent from mobile client systems 130 belonging to one or more users. Social-networking system 160 may determine that some background location updates 530 may be associated with a visit to place 510. In the example of FIG. 5B, there are eight background location updates 530 within place 510. If all eight background location updates 530 can be correlated with a visit to place 510, and foreground location updates 520A and 520B are also correlated to visits to place 510, social-networking system 160 may determine that there are ten total background-enabled users, of whom two sent foreground location updates. In particular embodiments, a foreground location update 520A-D and a background location update 530 may be sent by the same user within a proximate period of time. In such a situation, social-networking system 160 may de-duplicate the total number of location updates to account for unique users. If all ten location updates are sent by ten distinct users, then social-networking system 160 may determine a visit-extrapolation factor of five. If a location update 540 is received by social-networking system 160 for a foreground-only user (e.g. a user from the (F) group of users), and location update 540 corresponds to a visit to place 510, social-networking system 160 may estimate that there are five times as many total users of social-networking system 160 who have visited place 510 during the same period of time.

In particular embodiments, social-networking system 160 will store a plurality of ping compensation factors for each demographic category. In particular embodiments, a user may be considered for multiple demographic categories. Demographic categories may include shared interests of the users as indicated by social graph 200. As an example and not by way of limitation, a single user may be considered for demographic groups such as: female, age 18-34, college graduate, California resident, has accessed the social network every day in the past 28 days, and is interested in Star Wars. Other demographic categories may be determined for a user based on information that a user has provided to social-networking system 160, such as information on the user's profile on social-networking system 160.

In particular embodiments, social-networking system 160 may determine a plurality of ping compensation factors dependent on a particular period of time. As an example and not by way of limitation, social-networking system 160 may determine a set of ping compensation factors for different days of the week, time of day, seasons, whether it is a holiday, or weekdays vs. weekends. Social-networking system 160 may record the number of user visits for each period of time independently, and determine a ping compensation factor for each period of time. In particular embodiments, if an advertiser requests a ping compensation factor or conversion rate for a newly-defined demographic group, social-networking system 160 may filter the overall set of user visits for users matching that demographic group, and determine a ping compensation factor based on the filtered group of users.

In particular embodiments, social-networking system 160 may use a ping compensation factor to be applied to a particular class of places. In some cases, social-networking system 160 may not have sufficient information for users visiting a particular place to estimate a ping compensation factor for that place. As an example and not by way of limitation, a new restaurant that just opened may not have any information regarding users visits during the holiday season. As another example, a clothing store that is trying to expand into a new demographic group may not have sufficient user visits from users of that demographic to reliably estimate a ping compensation factor. Social-networking system 160 may determine a ping compensation factor for a place based on the ping compensation factor for similar places in the area, or for places that have targeted advertisements to the same demographic groups of users. As an example and not by way of limitation, a new Italian family-style may have opened, and the owners may wish to know what the conversion rate may be for particular demographic groups if they advertise through social-networking system 160. Social-networking system 160 may consider other Italian family-style restaurants in the region, or any other similar restaurants in the area, and determine the individual ping compensation factors for those other restaurants. In particular embodiments, social-networking system 160 may determine a weighted average of the ping compensation factors for the other restaurants, and use that ping compensation factor for the new restaurant.

As another example and not by way of embodiment, a new Starbucks® coffee shop may open in a particular region. Initially, there may be insufficient information for determining a ping compensation factor for the new location. Social-networking system 160 may use a weighted average of ping compensation factors determined for other Starbucks® locations nearby, or all coffee shops nearby which advertise to similar demographic groups of users as the new Starbucks® location. Alternatively, social-networking system 160 may consider other places in similarly situated locations even if they are not geographically nearby. As another example, if a new Starbucks® opens in a small Midwestern college town, social-networking system 160 may consider the ping compensation factors of Starbucks® located at other small Midwestern college towns to predict a ping compensation factor for the newest location.

In particular embodiments, social-networking system 160 may infer additional users who have accessed a social-networking application on their mobile client system 130 but have not sent location updates. As an example and not by way of limitation, some users may have location services disabled on their mobile client system 130. If such a user initiates a social-networking application, their mobile client system 130 will not send any location updates to social-networking system 160. Social-networking system 160 may determine for a group of users the proportion of users who do not have location services enabled, and adjust the determined number of foreground application users based on the proportion. As an example and not by way of limitation, 20% of male users aged 25-34 in San Francisco, Calif. may have location services disabled for social-networking applications. If social-networking system 160 subsequently detects 8 male users aged 25-34 at a place in San Francisco, Calif., then social-networking system 160 may infer that there are 2 additional male users aged 25-34 users at the place who should be considered foreground location update users.

In particular embodiments, social-networking system 160 may be able to infer that a particular user has visited a first location based on a recorded visit for at least one second location. Social-networking system 160 may determine that users who visit a particular second location have a discrete probability of subsequently visiting the first location, based on the recorded movements of other users. As an example and not by way of limitation, social-networking system 160 may determine that if users are recorded visiting place A and place B on the same day, 50% of those users also visited place C around the same time. In this example, for every two users detected at place A and place B on the same day (whether it's by foreground location updates, background location updates, or both), social-networking system 160 may determine that one of those users likely also visited place C, and add one user to the total number of visits in the appropriate category. As an example and not by way of limitation, if ten users in the same demographic category send background location updates from places A and B, and social-networking system 160 determines there is a 40% chance that a user in that particular demographic group will also visit place C, social-networking system 160 will add four background location update visits for place C for that time period.

In particular embodiments, as new location updates are received by social-networking system 160, social-networking system 160 will adjust the ping compensation factors for the appropriate time period and demographic groups as needed. As an example and not by way of limitation, if the current ping compensation factor for male users ages 18-34 for Abercrombie & Fitch® on weekdays is 12, and during the following week the ping compensation factor for this group during the weekdays is only 5, then the overall ping compensation factor for weekdays for this user group will be adjusted downwards. In particular embodiments, older visits may be decayed by a function over time, so that the ping compensation factor is more heavily weighted towards the more recent ratio of user visits.

In particular embodiments, as discussed above, social-networking system 160 may add to the ping compensation factor visits that are inferred either by the ratio of users who do not have any location services enabled, or an inferred co-visitation based on a user visit of a second location. Social-networking system 160 may add the user visits to the appropriate location method categories to adjust the ping compensation factor as needed.

In particular embodiments, social-networking system 160 may assume that the likelihood that a user will enable and use either foreground location updates or background location updates are independent of each other. In particular embodiments, a user that has foreground location updates enabled may be more likely to have background location updates enabled as well. In particular embodiments, a user that does not have foreground location updates enabled may be more likely to have both foreground and background location updates disabled on their mobile client system 130. As an example and not by way of limitation, the ratio of users with both background and foreground location updates disabled to foreground-only users may be higher than the ratio of background location update-only users to users with both location methods for a particular place. In this example, the overall ping compensation factor may be increased to account for the fact that the hidden group of users with both location update methods disabled is higher.

In particular embodiments, social-networking system 160 may determine a ping compensation factor for a demographic group of users with a reliable and consistent number of visits to determine the ping compensation factor, and extrapolate the ping compensation factor for that group to account for the entire population base of users. In particular embodiments, a ping compensation factor determined based on background-enabled users may need to be further adjusted when applied to foreground-only users, based on a difference in location update frequency between the two groups of users. In particular embodiments, a particular subset of background-enabled users may have even more frequent location updates. As an example and not by way of limitation, social-networking system 160 may sort users by the number of days in the last 28 days which the user has accessed social-networking system 160. There may be users who have accessed social-networking system 160 each of the past 28 days, i.e. daily users, who comprise a subset of all users of social-networking system 160. Because the daily users access social-networking system 160 more frequently, the chance that a daily user will access a social-networking application at a particular place may be higher than the average user. Social-networking system 160 may also determine that a daily user is more likely to have background location services enabled than the average user.

As an example and not by way of limitation, social-networking system 160 may determine that a daily user sends twice as many foreground location updates as the average user, regardless of the actual location of the location updates. Therefore, a ping compensation factor may be determined for the daily users, and then doubled for the general users. In this example, if the ping compensation factor for daily users is 10 (i.e. for every daily user at the place determined by sending location updates only through foreground location updates, there will be ten daily users at the place who did not send a location update by either method), the ping compensation factor for the average user may be determined to be 20 (i.e. since the average user only sends foreground location updates half as frequently as a daily user, there will be twenty times more average users that are not sending location updates, compared to foreground-only average users.)

In particular embodiments, social-networking system 160 may make further adjustments to the extrapolation of the ping compensation factor based on any differences between the demographic subset of users and the general population. As an example and not by way of limitation, if the set of daily users of social-networking system 160 tends to be younger than the general population of users of social-networking system 160, social-networking system 160 may determine any changes in the ping compensation factor for the different age groups, and apply that adjustment to the extrapolated ping compensation factor. As an example and not by way of limitation, in the above example, if the daily user group has an average age of 25, and the average age of the general population of users of social-networking system 160 is 30, social-networking system 160 may determine a difference in the ping compensation factor for users at age 25, versus users at age 30. If 25-year-old users tend to send twice as many foreground location updates as 30-year-olds, social-networking system 160 may double the ping compensation factor again when extrapolating the ping compensation factor of daily users to the general population of users.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

[98] In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 6:
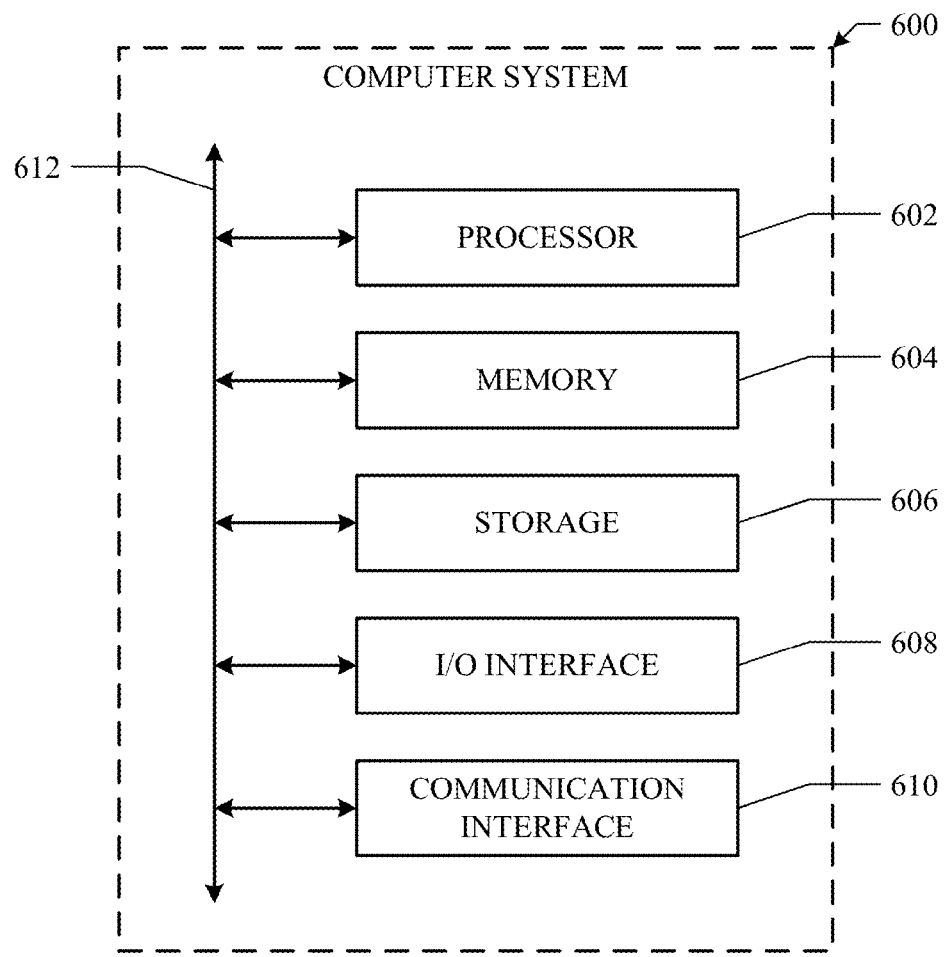
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, receiving a plurality of location updates sent by one or more users, wherein:
        the plurality of location updates correspond to a particular place;
        each of the plurality of location updates corresponds to a user visit by a user to the particular place; and
        each of the plurality of location updates is sent via one or more location methods implemented by a mobile client device of the user; and
    by the computing device, calculating a ping compensation factor for the particular place, wherein the calculation is based on:
        a total number of user visits to the particular place based on the plurality of location updates; and
        a subset of the total number of user visits to the particular place, wherein the subset corresponds to location updates sent by a first location method of the one or more location methods.

2. The method of claim 1, wherein the plurality of location updates correspond to a particular period of time during which the plurality of location updates were sent.

3. The method of claim 2, wherein the ping compensation factor is stored on a data store of a social-networking system, wherein the ping compensation factor is associated with the particular place and the particular period of time.

4. The method of claim 1, wherein:
    the one or more users are associated with a first demographic category; and
    the ping compensation factor is associated with the first demographic category.

5. The method of claim 4, further comprising:
    determining a plurality of users associated with a second demographic category; and
    determining a second ping compensation factor associated with the second demographic category, wherein the determination is based on:
        the ping compensation factor associated with the first demographic category;
        a frequency-ratio based on a number of location updates sent by the one or more users in the first demographic category and a number of location updates sent by the plurality of users in the second demographic category; and
        a method-ratio based on a first proportion of the one or more users in the first demographic category who have a second location method enabled for sending location updates, and a second proportion of the plurality of users in the second demographic category who have the second location method enabled.

6. The method of claim 5, wherein:
    the first demographic category comprises users who access a social-networking system on a daily basis; and
    the second demographic category comprises users who do not access the social-networking system on a daily basis.

7. The method of claim 1, further comprising:
  determining a number of visits to the particular place based on a second location method of the one or more location methods; and
  calculating an estimated number of visits to the particular place based on the ping compensation factor and the number of visits based on the second location method, wherein the estimated number of visits comprises user visits not recorded by a location update for the particular place.

8. The method of claim 1, wherein the one or more location methods comprise:
  a background location update provided by a mobile computing device associated with the user;
  the user being checked-in at the particular place on a social-networking system by another user;
  a location update of the user provided by a third party;
  a transaction data indicating a transaction activity of the user at the particular place;
  a location update sent through user input to the social-networking system;
  a location update sent through the user accessing the social-networking system on a mobile device; or
  the user checking-in at the particular place on the social-networking system.

9. The method of claim 8, wherein the user accessing the social-networking system on a mobile device comprises:
  the user accessing an application associated with the social-networking system; or
  the user accessing a webpage associated with the social-networking system.

10. The method of claim 8, wherein a location update is determined for the user at a first place based on a background location update of the user at a second place, wherein a visit to the second place is associated with a visit to the first place.

11. The method of claim 1, wherein a combined ping compensation factor is determined for a plurality of places based at least in part on the ping compensation factors for each of the plurality of places.

12. The method of claim 11, wherein the plurality of places are associated with one or more place categories.

13. The method of claim 11, wherein the plurality of places are associated with one or more geographic regions.

14. The method of claim 1, wherein the computing device is associated with a social-networking system, wherein the social-networking system comprises a social graph, the social graph comprising a plurality of nodes and a plurality of edges connecting the nodes, each of the edges between two of the nodes representing a single degree of separation between them, the nodes comprising a plurality of user nodes corresponding to a plurality of users associated with the social-networking system.

15. The method of claim 14, wherein a demographic category is determined for the plurality of users associated with the social-networking system based on a common edge or common node associated with each of the plurality of users associated with the social-networking system.

16. The method of claim 1, wherein the one or more users corresponds to one or more demographic categories, wherein each of the one or more demographic categories comprises a number of days in a previous time period during which the one or more users have accessed a social-networking system.

17. The method of claim 1, wherein the one or more users corresponds to one or more demographic categories, wherein each of the one or more demographic categories is based at least in part on:
  a geographic location of the one or more users;
  an age of the one or more users;
  profile information of the one or more users; or
  a shared interest of the one or more users.

18. The method of claim 1, wherein the one or more users corresponds to one or more demographic categories, wherein each of the one or more demographic categories comprises one or more users who received an advertisement referencing the particular place.

19. One or more non-transitory, computer-readable storage media embodying software that is operable when executed to:
  receive a plurality of location updates sent by one or more users, wherein:
    the plurality of location updates correspond to a particular place;
    each of the plurality of location updates corresponds to a user visit by a user to the particular place; and
    each of the plurality of location updates is sent via one or more location methods implemented by a mobile client device of the user; and
  calculate a ping compensation factor for the particular place, wherein the calculation is based on:
    a total number of user visits to the particular place based on the plurality of location updates; and
    a subset of the total number of user visits to the particular place, wherein the subset corresponds to location updates sent by a first location method of the one or more location methods.

20. The media of claim 19, wherein the plurality of location updates correspond to a particular period of time during which the plurality of location updates were sent.

21. The media of claim 20, wherein the ping compensation factor is stored on a data store of a social-networking system, wherein the ping compensation factor is associated with the particular place and the particular period of time.

22. The media of claim 19, wherein:
  the one or more users are associated with a first demographic category; and
  the ping compensation factor is associated with the first demographic category.

23. The media of claim 22, wherein the software is further operable when executed to:
  determine a plurality of users associated with a second demographic category; and
  determine a second ping compensation factor associated with the second demographic category, wherein the determination is based on:
    the ping compensation factor associated with the first demographic category;
    a frequency-ratio based on a number of location updates sent by the one or more users in the first demographic category and a number of location updates sent by the plurality of users in the second demographic category; and
    a method-ratio based on a first proportion of the one or more users in the first demographic category who have a second location method enabled for sending location updates, and a second proportion of the plurality of users in the second demographic category who have the second location method enabled.

24. The media of claim 23, wherein:
the first demographic category comprises users who access a social-networking system on a daily basis; and
the second demographic category comprises users who do not access the social-networking system on a daily basis.

25. The media of claim 19, wherein the software is further operable when executed to:
determine a number of visits to the particular place based on a second location method of the one or more location methods; and
calculate an estimated number of visits to the particular place based on the ping compensation factor and the number of visits based on the second location method, wherein the estimated number of visits comprises user visits not recorded by a location update for the particular place.

26. The media of claim 19, wherein the one or more location methods comprise:
a background location update provided by a mobile computing device associated with the user;
the user being checked-in at the particular place on a social-networking system by another user;
a location update of the user provided by a third party;
a transaction data indicating a transaction activity of the user at the particular place;
a location update sent through user input to the social-networking system;
a location update sent through the user accessing the social-networking system on a mobile device; or
the user checking-in at the particular place on the social-networking system.

27. The media of claim 26, wherein the user accessing the social-networking system on a mobile device comprises:
the user accessing an application associated with the social-networking system; or
the user accessing a webpage associated with the social-networking system.

28. The media of claim 26, wherein a location update is determined for the user at a first place based on a background location update of the user at a second place, wherein a visit to the second place is associated with a visit to the first place.

29. The media of claim 19, wherein a combined ping compensation factor is determined for a plurality of places based at least in part on the ping compensation factors for each of the plurality of places.

30. The media of claim 29, wherein the plurality of places are associated with one or more place categories.

31. The media of claim 29, wherein the plurality of places are associated with one or more geographic regions.

32. The media of claim 19, wherein the computing device is associated with a social-networking system, wherein the social-networking system comprises a social graph, the social graph comprising a plurality of nodes and a plurality of edges connecting the nodes, each of the edges between two of the nodes representing a single degree of separation between them, the nodes comprising a plurality of user nodes corresponding to a plurality of users associated with the social-networking system.

33. The media of claim 32, wherein a demographic category is determined for the plurality of users associated with the social-networking system based on a common edge or common node associated with each of the plurality of users associated with the social-networking system.

34. The media of claim 19, wherein the one or more users corresponds to one or more demographic categories, wherein each of the one or more demographic categories comprises a number of days in a previous time period during which the one or more users have accessed a social-networking system.

35. The media of claim 19, wherein the one or more users corresponds to one or more demographic categories, wherein each of the one or more demographic categories is based at least in part on:
a geographic location of the one or more users;
an age of the one or more users;
profile information of the one or more users; or
a shared interest of the one or more users.

36. The media of claim 19, wherein the one or more users corresponds to one or more demographic categories, wherein each of the one or more demographic categories comprises one or more users who received an advertisement referencing the particular place.

37. A system comprising:
one or more processors; and
a memory coupled to the processors comprising instructions executable by the processors, the processors being operable when executing the instructions to:
receive a plurality of location updates sent by one or more users, wherein:
the plurality of location updates correspond to a particular place;
each of the plurality of location updates corresponds to a user visit by a user to the particular place; and
each of the plurality of location updates is sent via one or more location methods implemented by a mobile client device of the user; and
calculate a ping compensation factor for the particular place, wherein the calculation is based on:
a total number of user visits to the particular place based on the plurality of location updates; and
a subset of the total number of user visits to the particular place, wherein the subset corresponds to location updates sent by a first location method of the one or more location methods.

38. The system of claim 37, wherein the plurality of location updates correspond to a particular period of time during which the plurality of location updates were sent.

39. The system of claim 38, wherein the ping compensation factor is stored on a data store of a social-networking system, wherein the ping compensation factor is associated with the particular place and the particular period of time.

40. The system of claim 37, wherein:
the one or more users are associated with a first demographic category; and
the ping compensation factor is associated with the first demographic category.

41. The system of claim 40, wherein the processors are further operable when executed to:
determine a plurality of users associated with a second demographic category; and
determine a second ping compensation factor associated with the second demographic category, wherein the determination is based on:
the ping compensation factor associated with the first demographic category;
a frequency-ratio based on a number of location updates sent by the one or more users in the first demographic category and a number of location updates sent by the plurality of users in the second demographic category; and
a method-ratio based on a first proportion of the one or more users in the first demographic category who have a second location method enabled for sending location updates, and a second proportion of the plurality of users in the second demographic category who have the second location method enabled.

42. The system of claim 41, wherein:
the first demographic category comprises users who access a social-networking system on a daily basis; and
the second demographic category comprises users who do not access the social-networking system on a daily basis.

43. The system of claim 37, wherein the processors are further operable when executed to:
determine a number of visits to the particular place based on a second location method of the one or more location methods; and
calculate an estimated number of visits to the particular place based on the ping compensation factor and the number of visits based on the second location method, wherein the estimated number of visits comprises user visits not recorded by a location update for the particular place.

44. The system of claim 37, wherein the one or more location methods comprise:
a background location update provided by a mobile computing device associated with the user;
the user being checked-in at the particular place on a social-networking system by another user;
a location update of the user provided by a third party;
a transaction data indicating a transaction activity of the user at the particular place;
a location update sent through user input to the social-networking system;
a location update sent through the user accessing the social-networking system on a mobile device; or
the user checking-in at the particular place on the social-networking system.

45. The system of claim 44, wherein the user accessing the social-networking system on a mobile device comprises:
the user accessing an application associated with the social-networking system; or
the user accessing a webpage associated with the social-networking system.

46. The system of claim 44, wherein a location update is determined for the user at a first place based on a background location update of the user at a second place, wherein a visit to the second place is associated with a visit to the first place.

47. The system of claim 37, wherein a combined ping compensation factor is determined for a plurality of places based at least in part on the ping compensation factors for each of the plurality of places.

48. The system of claim 47, wherein the plurality of places are associated with one or more place categories.

49. The system of claim 47, wherein the plurality of places are associated with one or more geographic regions.

50. The system of claim 37, wherein the computing device is associated with a social-networking system, wherein the social-networking system comprises a social graph, the social graph comprising a plurality of nodes and a plurality of edges connecting the nodes, each of the edges between two of the nodes representing a single degree of separation between them, the nodes comprising a plurality of user nodes corresponding to a plurality of users associated with the social-networking system.

51. The system of claim 50, wherein a demographic category is determined for the plurality of users associated with the social-networking system based on a common edge or common node associated with each of the plurality of users associated with the social-networking system.

52. The system of claim 37, wherein the one or more users corresponds to one or more demographic categories, wherein each of the one or more demographic categories comprises a number of days in a previous time period during which the one or more users have accessed a social-networking system.

53. The system of claim 37, wherein the one or more users corresponds to one or more demographic categories, wherein each of the one or more demographic categories is based at least in part on:
a geographic location of the one or more users;
an age of the one or more users;
profile information of the one or more users; or
a shared interest of the one or more users.

54. The system of claim 37, wherein the one or more users corresponds to one or more demographic categories, wherein each of the one or more demographic categories comprises one or more users who received an advertisement referencing the particular place.

* * * * *